(12) United States Patent
Hoffmann et al.

(10) Patent No.: US 8,800,697 B2
(45) Date of Patent: Aug. 12, 2014

(54) ELECTRIC-POWERED SELF-BALANCING UNICYCLE WITH STEERING LINKAGE BETWEEN HANDLEBARS AND WHEEL FORKS

(75) Inventors: Christopher J. Hoffmann, Portland, OR (US); Anthony J. Ozrelic, Bend, OR (US)

(73) Assignee: Ryno Motors, Inc., Portland, OR (US)

( * ) Notice: Subject to any disclaimer, the term of this patent is extended or adjusted under 35 U.S.C. 154(b) by 0 days.

(21) Appl. No.: 12/873,044

(22) Filed: Aug. 31, 2010

(65) Prior Publication Data

US 2012/0217072 A1 Aug. 30, 2012

Related U.S. Application Data

(60) Provisional application No. 61/275,845, filed on Sep. 1, 2009.

(51) Int. Cl.
*B62D 61/00* (2006.01)
*B62K 1/00* (2006.01)

(52) U.S. Cl.
CPC ..................... *B62K 1/00* (2013.01)
USPC .......................................... 180/21

(58) Field of Classification Search
CPC ........................................................ B62K 1/00
USPC .............. 700/71, 275, 279; 180/21, 182–185
See application file for complete search history.

(56) References Cited

U.S. PATENT DOCUMENTS

| | | | |
|---|---|---|---|
| 660,835 | A | 10/1900 | Boes |
| 734,109 | A | 7/1903 | Tolche |
| 1,585,258 | A | 5/1926 | Moore |
| 2,802,300 | A | 8/1957 | Rogers |

(Continued)

FOREIGN PATENT DOCUMENTS

| | | |
|---|---|---|
| CN | 2302942 Y | 1/1999 |
| CN | 201890317 U | 7/2011 |

(Continued)

OTHER PUBLICATIONS

Aleksander Polutnik, "eniCycle Electric Unicycle", brochure, circa before Aug. 31, 2009.

(Continued)

*Primary Examiner* — Mohammad Ali
*Assistant Examiner* — Sivalingam Sivanesan
(74) *Attorney, Agent, or Firm* — Kolisch Hartwell, P.C.

(57) ABSTRACT

A one-wheeled vehicle includes electric motors, a self-balancing system, and steering mechanism, wherein the electric motors and self-balancing system are disposed within the wheel of the one-wheeled vehicle. Side stirrup legs, which have foot pegs suitable for placement of a rider's feet while riding, are pivoted with respect to the wheel forks, such that the side stirrup legs may be rotated backwards and act as a kickstand for the one-wheeled vehicle. The side stirrup legs may be weighted with, for example, one or more batteries may be attached to the side stirrup legs to provide a weight distribution such that the one-wheeled vehicle does not fall forward when parked. A computational resource such as a microcontroller, or microprocessor-based controller, receives input signals indicative of operation of the twist throttle and brake, and responsive thereto produces signals to adjust the tilt angle relative to the acceleration and thereby reduce the need for a rider to lean forward or backwards.

13 Claims, 8 Drawing Sheets

(56) References Cited

U.S. PATENT DOCUMENTS

| | | | |
|---|---|---|---|
| 2,971,773 A | 2/1961 | McKissick | |
| 3,083,036 A | 3/1963 | Cornell, III et al. | |
| 3,260,324 A | 7/1966 | Suarez | |
| 3,399,742 A * | 9/1968 | Malick | 180/21 |
| 3,860,264 A | 1/1975 | Douglas et al. | |
| 4,062,558 A | 12/1977 | Wasserman | |
| 4,109,741 A | 8/1978 | Gabriel | |
| 4,241,931 A | 12/1980 | Healy | |
| 4,315,167 A | 2/1982 | Pelc | |
| D273,287 S | 4/1984 | Evans | |
| 4,498,036 A | 2/1985 | Salemka | |
| 4,549,123 A | 10/1985 | Hägglund et al. | |
| 4,657,272 A | 4/1987 | Davenport | |
| 4,733,149 A | 3/1988 | Culberson | |
| 4,912,381 A | 3/1990 | Culberson | |
| 5,002,931 A | 3/1991 | Rivier et al. | |
| 5,166,679 A | 11/1992 | Vranish et al. | |
| 5,314,034 A * | 5/1994 | Chittal | 180/21 |
| 5,371,670 A | 12/1994 | Lurie | |
| 5,442,347 A | 8/1995 | Vranish | |
| 5,550,701 A | 8/1996 | Nadd et al. | |
| 5,710,504 A | 1/1998 | Pascual et al. | |
| 5,719,788 A | 2/1998 | Seborg et al. | |
| 5,940,963 A | 8/1999 | Tolmie et al. | |
| 5,971,091 A | 10/1999 | Kamen et al. | |
| 6,081,751 A | 6/2000 | Luo et al. | |
| 6,302,230 B1 | 10/2001 | Kamen et al. | |
| 6,367,817 B1 | 4/2002 | Kamen et al. | |
| 6,431,301 B1 * | 8/2002 | Forbes | 180/185 |
| 6,508,431 B1 | 1/2003 | Gavit | |
| 6,561,294 B1 | 5/2003 | Kamen et al. | |
| 6,561,594 B1 * | 5/2003 | Lin | 301/124.2 |
| D489,027 S | 4/2004 | Waters | |
| D489,029 S | 4/2004 | Waters | |
| 6,722,608 B1 | 4/2004 | Gavit et al. | |
| D489,300 S | 5/2004 | Chang et al. | |
| D493,127 S | 7/2004 | Waters et al. | |
| D493,128 S | 7/2004 | Waters et al. | |
| D493,129 S | 7/2004 | Waters et al. | |
| D493,392 S | 7/2004 | Waters et al. | |
| D493,747 S | 8/2004 | Waters et al. | |
| 6,804,080 B1 | 10/2004 | Gavit et al. | |
| 6,814,324 B2 | 11/2004 | Gavit et al. | |
| 6,870,345 B1 | 3/2005 | Wand | |
| 6,876,512 B2 | 4/2005 | Gavit et al. | |
| 6,889,927 B2 | 5/2005 | Gavit et al. | |
| 6,906,890 B2 | 6/2005 | Gavit et al. | |
| 6,909,581 B2 | 6/2005 | Gavit et al. | |
| 7,004,271 B1 | 2/2006 | Kamen et al. | |
| 7,099,120 B2 | 8/2006 | Gavit et al. | |
| D528,468 S | 9/2006 | Arling et al. | |
| D551,592 S | 9/2007 | Chang et al. | |
| D551,722 S | 9/2007 | Chang et al. | |
| 7,344,101 B2 | 3/2008 | Gavit et al. | |
| 7,461,714 B2 * | 12/2008 | Holland | 180/206.7 |
| 7,537,228 B2 | 5/2009 | Shimizu et al. | |
| 7,572,998 B2 | 8/2009 | Mohamed et al. | |
| 7,633,252 B2 | 12/2009 | Maue et al. | |
| 7,740,099 B2 | 6/2010 | Field et al. | |
| 7,757,794 B2 | 7/2010 | Heinzmann et al. | |
| 7,857,088 B2 | 12/2010 | Field et al. | |
| 7,900,725 B2 | 3/2011 | Heinzmann et al. | |
| 7,962,256 B2 | 6/2011 | Stevens et al. | |
| 7,963,352 B2 | 6/2011 | Alexander | |
| 7,979,179 B2 | 7/2011 | Gansler | |
| 8,146,696 B2 | 4/2012 | Kaufman | |
| 8,381,847 B2 | 2/2013 | Polutnik | |
| 2004/0150187 A1 | 8/2004 | Chen | |
| 2004/0218308 A1 | 11/2004 | Gavit et al. | |
| 2005/0084345 A1 * | 4/2005 | Frye et al. | 408/129 |
| 2005/0087379 A1 * | 4/2005 | Holland | 180/205 |
| 2006/0032960 A1 | 2/2006 | Gavit et al. | |
| 2006/0237945 A1 * | 10/2006 | Hauer | 280/260 |
| 2006/0279057 A1 * | 12/2006 | Shimizu et al. | 280/205 |
| 2007/0158117 A1 * | 7/2007 | Alexander | 180/21 |
| 2007/0296170 A1 | 12/2007 | Field et al. | |
| 2008/0039990 A1 | 2/2008 | Stevens et al. | |
| 2008/0161990 A1 | 7/2008 | Gansler | |
| 2008/0237484 A1 | 10/2008 | Morfill et al. | |
| 2009/0055033 A1 | 2/2009 | Gansler et al. | |
| 2009/0099762 A1 | 4/2009 | Heinzmann et al. | |
| 2009/0105908 A1 | 4/2009 | Casey et al. | |
| 2010/0051371 A1 | 3/2010 | Kaufman | |
| 2010/0114468 A1 | 5/2010 | Field et al. | |
| 2010/0207564 A1 | 8/2010 | Robinson | |
| 2010/0222994 A1 | 9/2010 | Field et al. | |
| 2010/0263167 A1 * | 10/2010 | Fox | 16/400 |
| 2011/0056757 A1 * | 3/2011 | Polutnik | 180/65.51 |
| 2011/0191013 A1 | 8/2011 | Leeser | |
| 2011/0209929 A1 | 9/2011 | Heinzmann et al. | |
| 2011/0213522 A1 | 9/2011 | Stevens et al. | |
| 2011/0220427 A1 | 9/2011 | Chen | |

FOREIGN PATENT DOCUMENTS

| | | |
|---|---|---|
| CN | 102139733 B | 11/2012 |
| DE | 97326 | 10/1897 |
| DE | 202008010306 U1 | 10/2008 |
| EP | 0203550 A1 | 12/1986 |
| EP | 1174334 A2 | 1/2002 |
| EP | 2105376 A1 | 9/2009 |
| EP | 2409905 | 1/2012 |
| JP | 48033485 U | 4/1973 |
| JP | 56089788 U | 7/1981 |
| JP | 2001-030972 | 2/2001 |
| TW | 298190 | 9/2006 |
| TW | M403480 | 5/2011 |
| TW | M424290 | 3/2012 |
| TW | 201213188 A1 | 4/2012 |
| WO | 0115962 A1 | 3/2001 |

OTHER PUBLICATIONS

Author Unknown, "Motor Wheel", photograph, circa 1931.

Author Unknown, Motor Unicycle, photograph, circa before Aug. 31, 2009.

Author Unknown, one-wheeled-motorcycle, photograph, circa before Aug. 31, 2009.

Syd Mead Unicycle, circa before Aug. 31, 2009.

Professor Klaus Hofer from the University of Applied Sciences in Bielefeld, Germany, "Electric Vehicle on one Wheel", research paper published by Vehicle Power and Propulsion, pp. 517-521, presented Sep. 7-9, 2005, at the 2005 IEEE Conference.

Professor Klaus Hofer from the University of Applied Sciences in Bielefeld, Germany, "Observer-Based Drive-Control for Self-Balanced Vehicles", research paper published by IEEE Industrial Electronics, IECON 2006—32nd Annual Conference, pp. 3951-3956, presented Nov. 10, 2006, at the 2006 IEEE Conference.

Klaus Hofer, "Electric Drive System for Self-Balanced Vehicles", research paper published by Industry Applications, 2010 9th IEEE/IAS International Conference, presented Nov. 8-10, 2010, at the 2010 IEEE Conference.

Huang et al., "The Development of Self-Balancing Controller for One-Wheeled Vehicles", article published online at http://www.scirp.org/journal/eng/ by Scientific Research, Apr. 2010, pp. 212-219.

Kadis et al. of The University of Adelaide, Australia, "Modelling, simulation and control of an electric unicycle", research paper published by ARAA, 2010, presented Dec. 1-3, 2010, at the 2010 ACRA Conference on Robotics & Automation in Brisbane, Australia.

Lauwers et al. from the Robotics Institute of Carnegie Mellon University, Pittsburgh, Pennsylvania, "A Dynamically Stable Single-Wheeled Mobile Robot with Inverse Mouse-Ball Drive", research paper published by Robotics and Automation, 2006, pp. 2884-2889, presented May 2006, at the IEEE Conference on Robotics and Automation in Orlando, Florida, USA.

Nagarajan et al., "State Transition, Balancing, Station Keeping, and Yaw Control for a Dynamically Stable Single Spherical Wheel Mobile Robot", research paper published by Robotics and Automa- (56) References Cited

OTHER PUBLICATIONS tion, May 2009, pp. 998-1003, presented May 12-17, 2009, at the 2009 IEEE International Conference on Robotics & Automation in Kobe, Japan.

Nakajima et al. from the Intelligent Robot Laboratory, Institute of Information Science and Electronics, University of Tsukuba, Kanagawa, Japan, "A Development of a New Mechanism of an Autonomous Vehicle", research paper published by Intelligent Robots and Systems, 1997, pp. 906-912, presented Sep. 7-11, 1997, at the IEE/RSJ International Conference.

Sheng et al., "Postural Stability of a Human Riding a Unicycle and Its Emulation by a Robot", published by Robotics and Automation, Oct. 1997, vol. 13, No. 5, pp. 709-720.

* cited by examiner

ELECTRIC-POWERED SELF-BALANCING UNICYCLE WITH STEERING LINKAGE BETWEEN HANDLEBARS AND WHEEL FORKS

CROSS-REFERENCE TO RELATED APPLICATIONS

This nonprovisional application claims the benefit of provisional Application No. 61/275,845, filed 1 Sep. 2009, entitled "Electric Balancing Unicycle", the entirety of which is hereby incorporated by reference.

COPYRIGHT AUTHORIZATION LANGUAGE UNDER 37 CFR §1.71(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to self-balancing electric transportation and sport vehicles, and more particularly relates to a self-balancing electric unicycle.

BACKGROUND

The desire for new forms of transportation is an ongoing pursuit of modern man. Some of the challenges of designing vehicles revolve around high energy-efficiency while maintaining good usability. User fun factor is also a part of the equation and this sometimes offsets sub-optimal performance in various other aspects of such vehicles. Reducing weight by simplifying the structure of a vehicle is also a consideration when designing new vehicles.

Personal transportation vehicles such as scooters and motorcycles have known levels of user excitement when ridden. They are considered primarily a point-to-point mode of transportation, and not necessarily seen as an entertainment ride. Once the rider has mastered how to operate them, scooters are seen as something you point in the direction of where you want to go and then wait until you get there.

One form of wheeled vehicle is the unicycle. Although the unicycle is entertaining for some, overall it is not an effective mode of transportation because of, among other things, balance and speed issues. Unlike multi-wheeled vehicles, much more skill and effort are required to balance and steer, or maneuver, a unicycle. Additionally, unlike multi-wheeled vehicles, which are larger than unicycles, there is little room for energy storage and power generation in a unicycle. However, a one-wheeled vehicle, i.e., a unicycle, is lightweight and has a small footprint, both of which are desirable characteristics for a transportation device.

What is needed is a unicycle that is self-balancing, self-powered, and easy for a rider to steer, or maneuver.

SUMMARY OF THE INVENTION

Briefly, a one-wheeled transportation vehicle includes electric motors, a self-balancing system, and steering mechanism, wherein the electric motors and self-balancing system are disposed within the wheel of the one-wheeled transportation vehicle.

In a further aspect of the present invention, side stirrup legs, which have foot pegs suitable for placement of a rider's feet while riding, are pivoted and weighted such that the side stirrup legs act as a kickstand for the one-wheeled vehicle. In some embodiments one or more batteries may be attached to the side stirrup legs to provide a weight distribution such that the one-wheeled vehicle does not fall forward when parked.

In a further aspect of the present invention, a computational resource such as a microcontroller, or microprocessor-based controller, receives input signals indicative of operation of the twist throttle and brake, and responsive thereto produces signals to adjust the tilt angle relative to the acceleration and thereby reduce the need for a rider to lean forward or backwards.

BRIEF DESCRIPTION OF THE DRAWINGS

The figures illustrate various components and their arrangements and interconnections. Unless expressly stated to the contrary, the figures are not necessarily drawn to scale.

DETAILED DESCRIPTION

Generally, an electric-powered, self-balancing unicycle includes a drive system and a braking system disposed within the one wheel of the unicycle, and further includes handlebars and a steering linkage from the handlebars to the wheel forks.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Terminology

The term jackshaft refers to a shaft used to transfer rotational energy in a machine.

The expression rake angle refers to the angle between the steering axis and vertical line normal to the ground and the rotational axis of the wheel being steered.

Various embodiments of the present invention provide users a new form of riding excitement that allows them to master beginner levels of skill and advance to higher levels of skill all while enjoying the experience of riding. A unicycle offers three degrees of freedom (pitch, tilt and yaw) to twist, tilt, curve and spin in ways that are not attainable on any other 2, 3 or 4, wheeled vehicles.

To further enhance the riding experience, a complex combination of human to machine interface features are integrated into embodiments of the present invention.

For a human to fully experience traveling across the ground with a sense to "look and just goes there", the human must be coupled to a vehicle in a way that takes full advantage of their arms, legs, seat, upper body and lower body mass, and their natural sense of balance. Various embodiments of the present invention provide an arrangement of a set of handlebars, steering geometry, seat, foot pegs and a body structure, all working together in a new and novel way.

Certain aspects of the present invention relate to a body structure. This body structure connects each of the sub-systems and houses the battery and control boards. Such a body may be fabricated from a variety of materials. It is desirable that the material(s) used to fabricate the body structure have the characteristics of being strong, lightweight and easy to manufacture.

Various embodiments of the present invention provide a main wheel and drive system. This drive system propels the vehicle forward and supports the weight of the vehicle. The wheel may include an outer rim to hold a standard rubber tire, an inner hub that attaches to the drive hub and a connecting structure such as spokes that radiate out from the hub to the wheel rim. In this illustrative embodiment, the spokes are offset to one side to allow maximum clearance for the electric motors and belt drives that are located inside the wheel volume.

Figure 3:
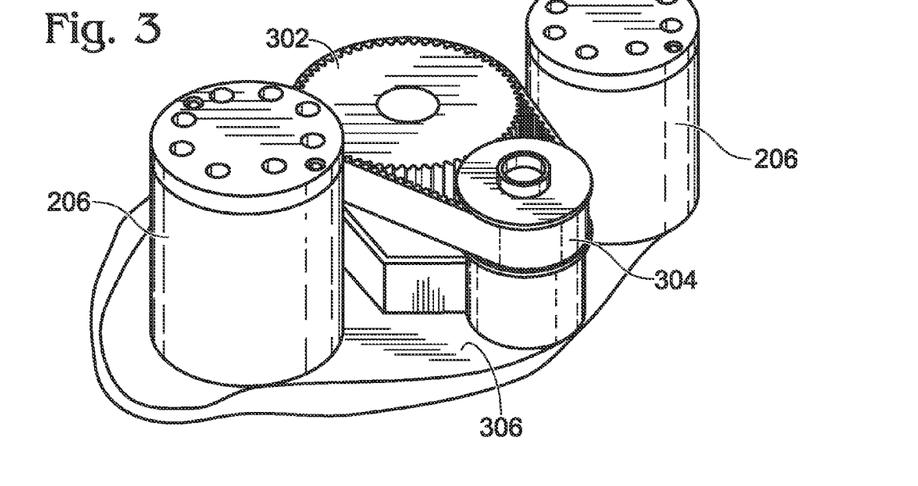
FIG. 3 shows an illustrative motor drive assembly in accordance with the present invention
Figure 4:
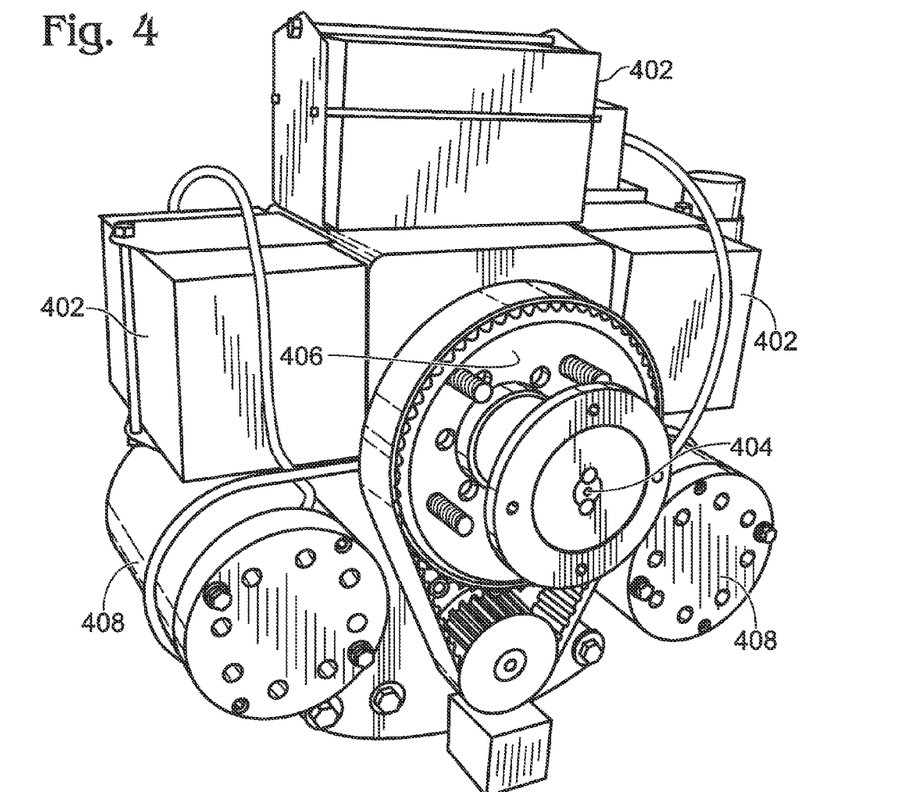
FIG. 4 shows an illustrative motor bracket assembly with three batteries attached.

Inside the wheel is the main drive train (see FIGS. 3-4). In this illustrative embodiment, the main drive train includes two DC motors that are mounted to a motor bracket and connect though a chain or belt drive to a common jackshaft. On the other end of the jackshaft is a timing belt sprocket that connects to a main drive sprocket mounted to the wheel drive hub. This drive hub has a set of lug nuts secured to it that allows the wheel to be securely bolted to the hub. At the center of the drive train is a solid axle, around which the wheel hub revolves. The wheel hub has a set of ball bearings pressed into it and slipped over the axle. The drive train also includes an encoder that provides data feedback to the motor controller to allow it to monitor motor speed and position. When electric power is applied to the DC motor, the drive train will cause the wheel and tire to spin causing the vehicle to move forward or back depending on the DC polarity.

The main drive train is connected to the body structure through a removable set of forks. These forks attach to the drive train at the centerline of the axle by means of an attachment flange. This flange also forms the attachment point for the foot platforms and foot pegs. At the top of the forks is a cross piece that connects the two forks together and supports the fork pivot shaft. This shaft allows the forks to rotate around a single axis of rotation thereby steering the wheel. The forks may also include a set of shock absorbers to accommodate uneven terrain.

In alternative embodiments of the present invention, a set of foot platforms that allow the rider to stand up on a horizontal surface parallel to the ground when the cycle is in an upright and balanced position is included. This platform offers the rider an intuitive reference to the tilt angle of the vehicle. These "L" shaped (when viewed from behind) platforms attach to the center flange of the forks. In another embodiment, a second set of foot pegs, or platforms, are attached directly to the upper body structure. These allow the rider to position his or her feet at a more comfortable location when seated on the seat and riding forward over longer distances.

In typical embodiments, a set of electronic controls is mounted in the body structure. These devices are broken into four systems: (1) the motor control amplifiers; (2) the micro-controller; (3) the gyro stabilization device; and (4) the system outboard accessories such as turn signals and headlights.

The motor controllers are designed to take a high voltage and high amperage direct current DC energy stored in the batteries and convert it into a proportional amount of current to match the system requirements. This motor controller can be built from a variety of known components. In typical embodiments it is an H-bridge motor controller.

The micro-controller monitors the gyro input, the encoder feedback from the drive train and the software that controls the dynamics of the system. In its simplest form the micro-controller relies on a conventional proportional/integral/differential (PID) system that looks at the motor rotational position, velocity and how fast the motor is responding to tilt angle variations. This micro-controller looks at pulse width modulated signals from the gyro and makes motor speed adjustments to keep the vehicle upright.

In typical embodiments, the gyro stabilization device is a commercially available hobby type radio control (R/C) helicopter gyro. It puts out a standard pulse width modulated (PWM) signal that is well-known in the hobby R/C world. Like any normal auto-pilot control system, as the outside environmental changes effect the desired trajectory, the gyro will output a control signal to compensate and keep the vehicle on the desired heading. In this illustrative example, when the gyro is tilted forward or back, the motor runs in the opposite direction to keep the cycle balanced. These changes are read by the micro-controller and turned into motor speed and direction commands to keep the cycle in an upright position. Alternative embodiments may include a micro-controller that has an integrated gyro.

In various embodiments of the present invention including a gyro stabilization system, the rider uses a twist throttle, similar to a motorcycle's, to advance an input signal to the control system. This control commands the micro-controller to advance through an algorithm, which compensates for all, or a substantial number of, the variables needed to propel the cycle forward while reducing the need for the rider to lean forward or back. To achieve this, the control system looks at the position of the twist grip to change the tilt angle; the motor then modifies its speed to maintain the right tilt angle. The position of the throttle also sets an acceleration curve that is modified by the ability of the motor to accelerate in a given time frame and the need to keep the tilt angle within a range where the cycle will not fall forward or back.

This balancing is achieved through tying the acceleration rate of the motor to the tilt angle. As long as the motors have enough torque to move the cycle forward at an increasing speed, the tilt angle will be allowed to increase slightly more in proportion to the acceleration rate. This keeps the center of gravity, or center of mass, ahead of the tilt angle. In turn, this keeps the cycle from falling over backwards during acceleration. Like running while balancing a broom in your palm, as long as you are increasing your speed, the "G" forces of the acceleration will hold the broom up. As the torque curve of the motor flattens out and slows in its ability to keep accelerating the cycle (less "G" force), the tilt angle will slowly move past center and fall on the other side or to a negative angle in relation to the center of mass. This keeps the cycle from falling forward as the speed increases but the "G" force of acceleration starts to diminish. As the cycle reaches full speed, the tilt angle will return to an almost vertical position in relation to the ground.

In typical embodiments of the present invention, the input that dictates the speed of the cycle, is the position (in degrees of rotation) of the twist throttle. The parameter or condition that dictates the rate of acceleration is how fast the throttle is twisted in a given time frame. For example, if the rider is at a standstill and twists the throttle slowly the cycle will slowly tilt forward and roll forward. If from a stand still, the rider twists the throttle radically, the cycle will actually reverse the wheel for a moment to get the tilt angle moving in the forward direction and then drive the motors to propel the cycle forward at a high speed. This control is designed to allow riders a much more controlled ride for situations where high acceleration is needed.

Normally the rider would have to lean forward with a lot of force to get the simpler "balance only" control to run the motor speed high enough to reach its maximum speed. This is due to the nature of the simple control where the motor always speeds up just enough for the cycle to stay vertical.

A further aspect of the present invention provides a brake system that works in a manner similar to that of the throttle system described above, but working in the opposite direction. When the brake lever is pulled, the unicycle tilts backwards forcing the balance control to slow unicycle down. As the unicycle decelerates to a walking speed, with the brake handle pulled, the tilt angle slowly returns to level balance.

System outboard accessories may include turn signals, headlights and stop lights, that are typically controlled by switches and the micro-controller.

Typical embodiments of the present invention include a battery or a set of batteries to supply power to the drive system. It is desirable that the one or more batteries be easily removable through a tilt-out or slide-out cartridge system. The ability to easily remove the one or more batteries facilitates parking the unicycle (e.g., on the street) and swapping one or more batteries for charged replacements, or taking the one or more batteries to a second location to be charged. It is noted that any suitable form of electrical power source may be used, and consequently the present invention is not limited to batteries.

Embodiments of the present invention typically include a seat and handlebars. A U-shaped handle bar at the front is configured to allow significant comfort and the ability to hold onto them in a variety of different body positions while being seated, standing and operating the unicycle in a variety of gymnastic type positions. A U-shaped handgrip behind the seat also allows the rider to hold on at a variety of positions to allow different tricks to be performed.

Embodiments of the present invention typically include a set of foot platforms that allow the rider to stand-up on a level wide surface. Connected to the wheel center portion of the forks, these platforms create a surface that is parallel to the ground when the cycle is balanced. The human mind has a natural ability to balance the body and know where its center of gravity is based on how the bottom of the foot senses what is level and how the inner ear stays balanced. By providing a set of platforms and not a simple foot-peg, (as a motorcycle would have) this embodiments of the present invention offer a unique riding experience that is in harmony with how the body naturally balances.

Embodiments of the present invention typically include a set of small swing arms that allow the cycle to absorb bumps in the road and sudden changes in elevation.

Various embodiments of the present invention include a motor driven flywheel stabilization system internal to the wheel cavity that keeps the unicycle from tipping side to side yet allows the unicycle to rotate on an axis similar to the rake angle of a typical two-wheeled steering system. Mounted under the drive motors, this system has a high-speed flywheel that imposes stability on the unicycle while allowing it to steer like a conventional unicycle.

Figure 1:
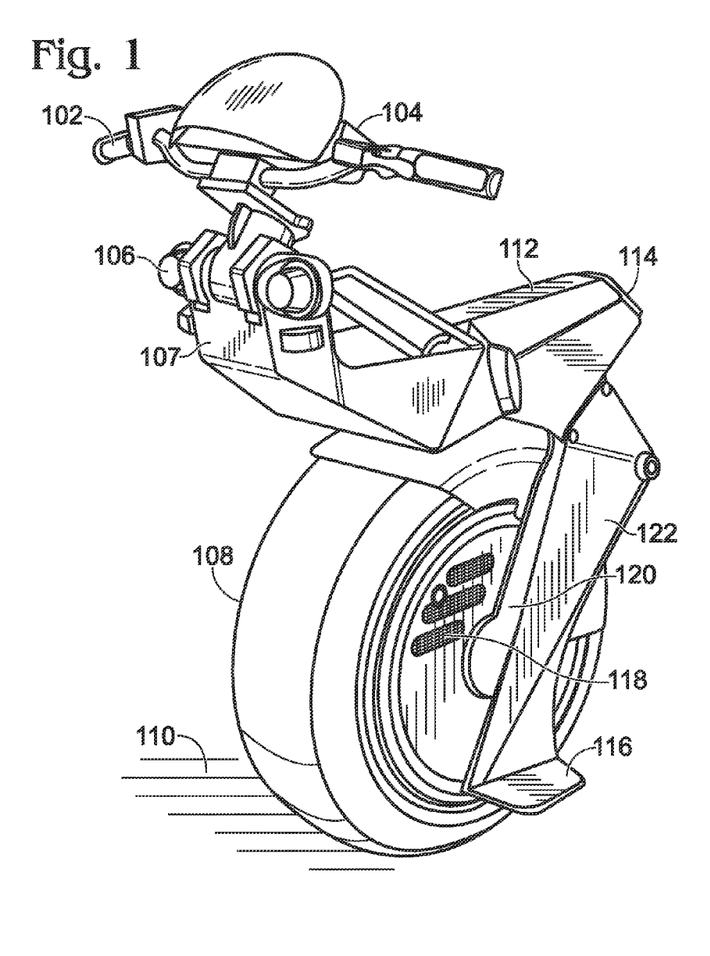
FIG. 1 is a side elevation of a self-balancing unicycle in accordance with the present invention.

Referring to FIG. 1, a side elevation of a self-balancing unicycle in accordance with the present invention is shown. In this illustrative embodiment, the self-balancing unicycle includes handle bars 102, displays 104, headlights 106, a storage basket 107, a tire 108, a seat 112, a rear handle bar 114, a foot platform 116 disposed on a side stirrup 122, and a wheel fork 120. Rear handle bar 114 provides a hand hold for users and facilitates holding, moving, and/or loading the unicycle. It will be appreciated that a wheel fork, side stirrup, and foot platform are also on the side of the unicycle that is not shown in FIG. 1. In FIG. 1, tire 108 is approximately 25 inches in diameter, and is disposed on a surface 110, such as for example the ground, a road, and so on.

Figure 2:
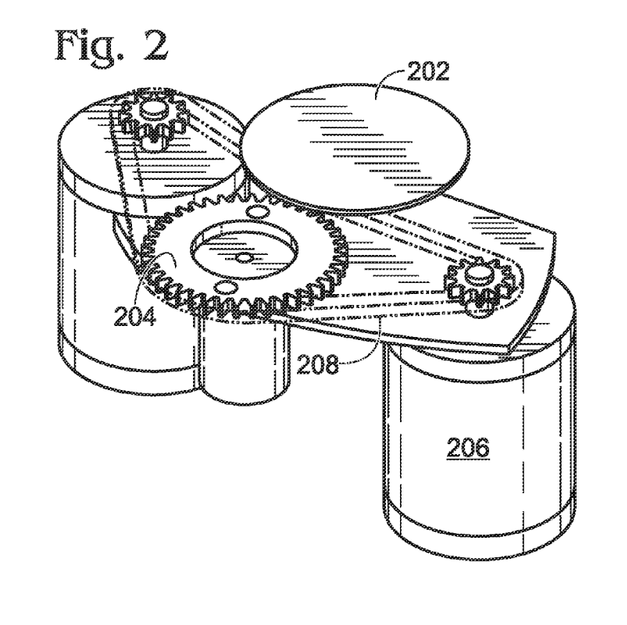
FIG. 2 shows an illustrative motor drive assembly in accordance with the present invention

FIGS. 2 and 3 show an illustrative motor drive assembly in accordance with the present invention. Attached to a motor bracket are two drive motors 206. Each motor 206 has a drive-sprocket, which connects a jackshaft through a roller chain 208. The jackshaft then drives a main wheel hub though a timing belt drive 304. The smaller sprocket of the timing belt drive attaches to the jackshaft while the larger one attaches to the wheel hub (not shown). A wheel is bolted to the wheel hub with a set of lug nuts. This arrangement creates a speed-reduction system that is easy to maintain, light-weight and low-cost. This belt drive system unlike other vehicle gear drive systems allows the user to modify the speed reduction ratios to tailor the torque curves to match the terrain and driving conditions. An advantageous feature of the drive system in accordance with the present invention is how it all mounts inside the confines of the wheel. This eliminates the need for long external drive chains as are found in a conventional motorcycle. It also reduces the complexity of the overall design. In this illustrative embodiment motors 206 are DC electric motors.

Referring to the alternative embodiment of FIG. 4, an illustrative motor bracket assembly with three batteries 402 attached is shown. A pair of motors 408 can be seen at the lower four and eight o'clock positions. The wheel center line is shown at 404. A large timing belt sprocket 406 at the center has four lug-nuts that mount to the wheel. At the center of the lug-nut pattern is a flange that secures the motor bracket to the wheel forks. This arrangement keeps the motor bracket stationary to the frame of the unicycle. The main sprocket 406 rotates around the center shaft.

Figure 5:
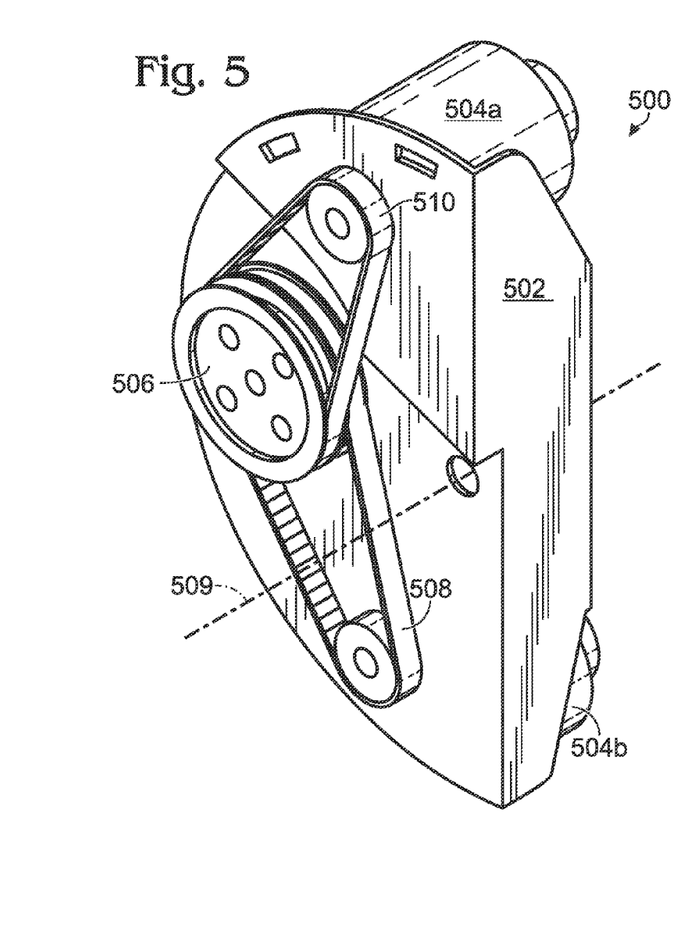
FIG. 5 is a side view of an illustrative motor drive assembly in accordance with the present invention showing two electric motor drive sprockets coupled to a jackshaft sprocket by belts.

FIG. 5 is a side view of an illustrative motor drive assembly 500, in accordance with the present invention, showing two electric motor drive sprockets coupled to a jackshaft sprocket by belts. In the assembled unicycle wheel, motor drive assembly 500 is disposed inside the wheel. A first electric motor 504a and a second electric motor 504b are attached to a mounting bracket 502. The drive sprocket of first electric motor 504a is coupled to a jackshaft sprocket 506 by belt 510. The drive sprocket of second electric motor 504b is coupled to jackshaft sprocket 506 by belt 508. The line 509 in FIG. 5 indicates the centerline, i.e., the axis of rotation for the assembled unicycle wheel.

Figure 6:
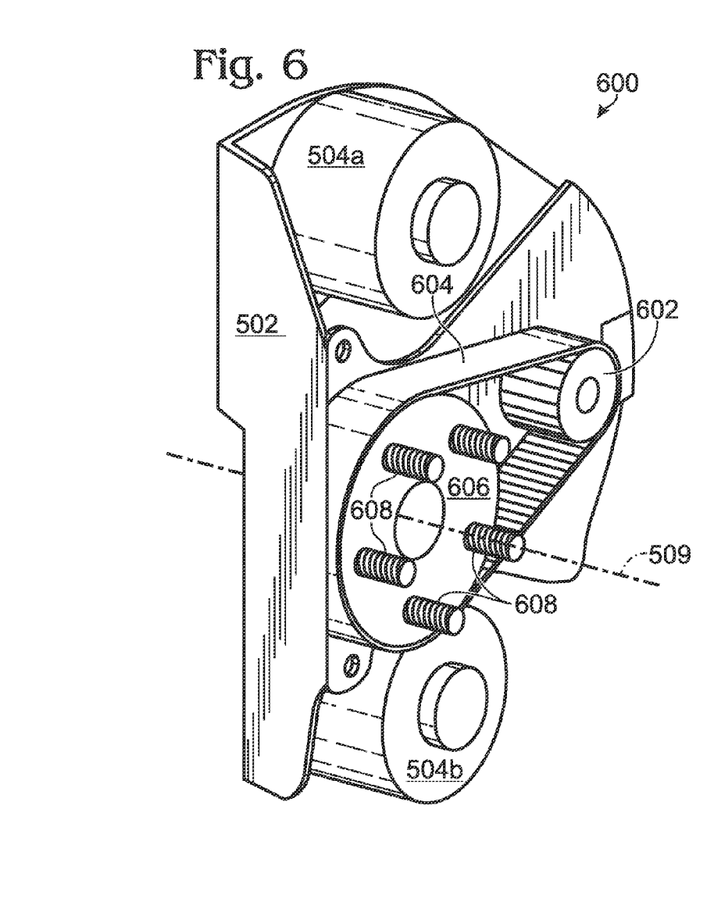
FIG. 6 is a side view of an illustrative motor drive assembly in accordance with the present invention showing two electric motors, and a jackshaft coupled to the main drive sprocket by a belt.

FIG. 6 is a side view of an illustrative motor drive assembly 600 in accordance with the present invention showing two electric motors 504a, 504b, attached to mounting bracket 502, and a jackshaft 602 coupled to a main drive sprocket 606 by a belt 604. It is noted that FIG. 6 is related to FIG. 5, and shows the opposite side of mounting bracket 502. A plurality of threaded studs 608 extend outwardly from main drive sprocket 606 as shown. The main drive is coupled to the wheel hub by means of threaded studs 608 and lug nuts (not shown in this figure).

Figure 7:
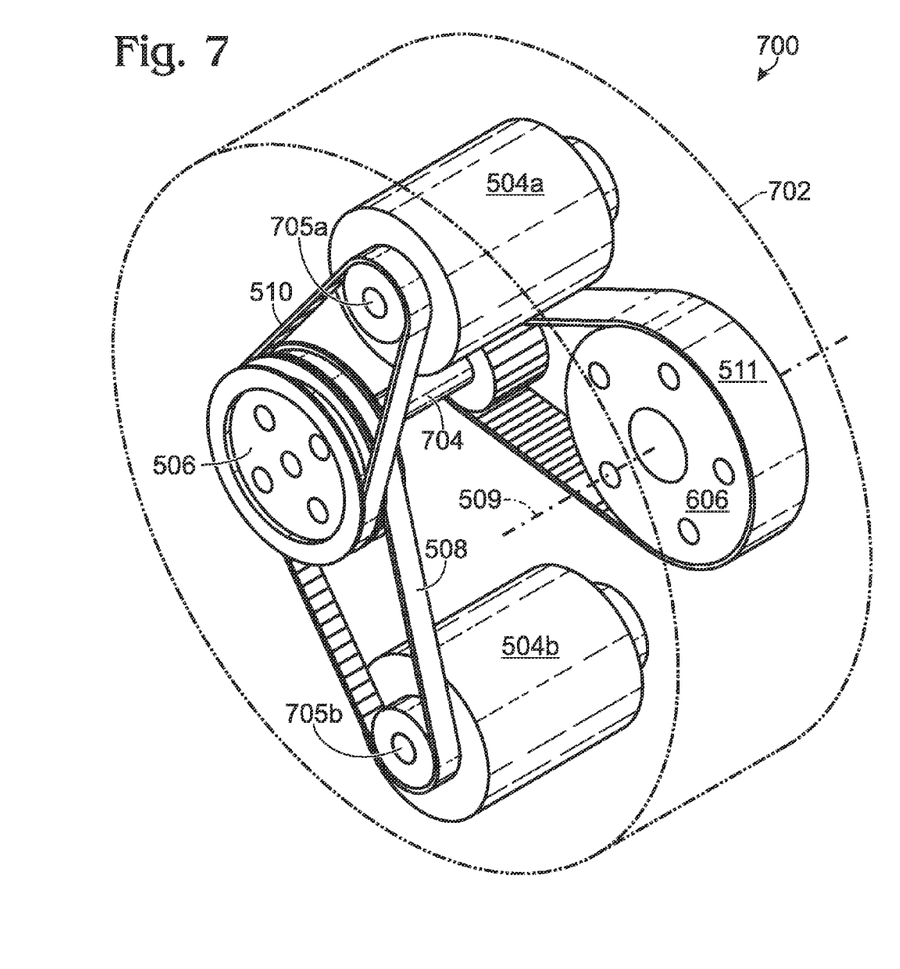
FIG. 7 illustrates the belt drive system in accordance with the present invention by showing the various components and their spatial relationship, but without showing the mounting bracket of FIGS. 5 and 6.

FIG. 7 illustrates a belt drive system 700 in accordance with the present invention by showing the various components and their spatial relationship, but without showing the mounting bracket 502 of FIGS. 5 and 6. Phantom lines 702 are used to indicate a volume that is enclosed by the rim and wheel covers, and within which belt drive system 700 is disposed. FIG. 7 shows first electric motor 504a having first drive sprocket 705a; and second electric motor 504b having second drive sprocket 705b. Belt 510 couples first drive sprocket 705a to jackshaft sprocket 506; and belt 508 couples second drive sprocket 705b to jackshaft sprocket 506. The rotational energy of the first and second electric motors 504a, 504b is transferred to a jackshaft 704 by means of belts 508, 510, which drive jackshaft sprocket 506. Jackshaft 704 is coupled to main drive sprocket 606 by means of belt 511. In this way, the rotational energy of electric motors 504a, 504b, is transferred to jackshaft sprocket 506 and then to main drive sprocket 606. In the fully assembled wheel of the unicycle, main drive sprocket 606 is bolted to the wheel hub.

Figure 8:
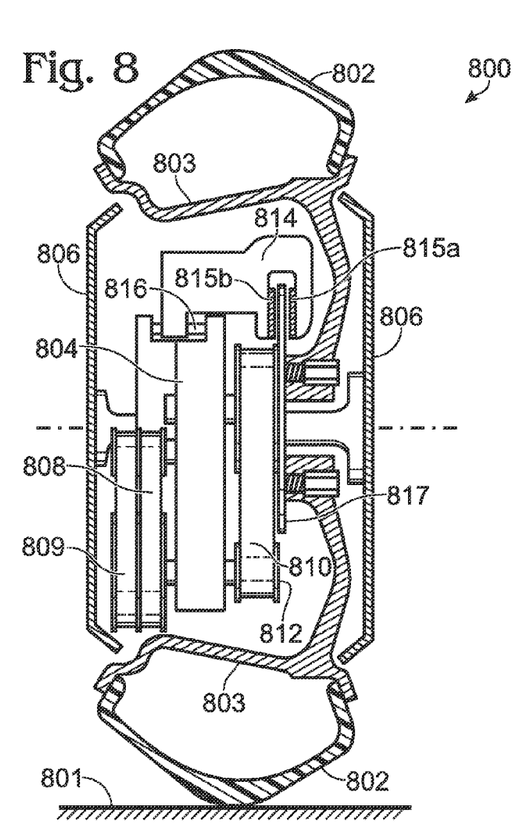
FIG. 8 is a cross-sectional view of a wheel of a unicycle in accordance with the present invention

FIG. 8 is a cross-sectional view of a wheel 800 of a unicycle in accordance with the present invention. Wheel 800 is disposed on the ground 801 in this illustration. Wheel 800 includes a tire 802 that is fitted to a rim 803. Within the volume defined by rim 803 and a pair of wheel covers 806 are the drive and braking systems of the unicycle. In this illustrative embodiment, two DC electric motors (not visible in this view) are attached to a mounting bracket 804. A belt 808 is looped around the drive sprocket of the first electric motor and the jackshaft sprocket. A belt 809 is looped around the drive sprocket of the second electric motor and the jackshaft sprocket. In this way the electric motors drive jackshaft 812. A belt 810 transfers the rotational energy of the jackshaft to the main drive sprocket. The main drive sprocket is attached to the wheel by means of a set of lug nuts that engage with threaded studs. Thus the power from the electric motors is transferred to the wheel 800.

Still referring to FIG. 8, various elements of the braking system can be seen. Calipers 814 are configured to bring brake pads 815a, 815b into contact with rotor 817 in order to slow or stop wheel 800. The braking system of this illustrative embodiment includes a pawl (not shown in FIG. 8) engaged with a shaft 816 that adjusts the distance of the interior brake pad 815b from rotor 817.

Figure 9:
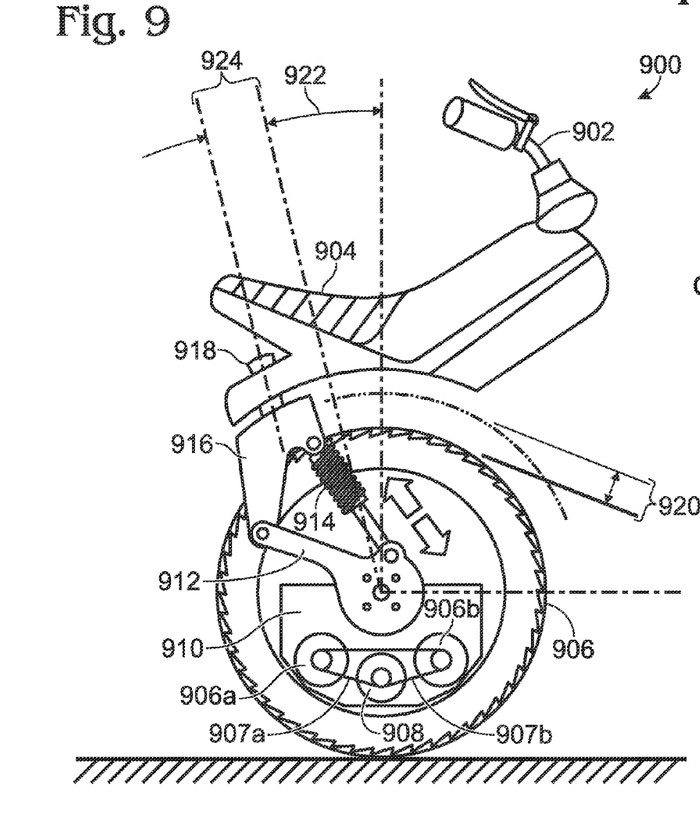
FIG. 9 is a side view of an illustrative unicycle in accordance with the present invention showing various elements of the drive system and suspension.

FIG. 9 is a side view of an illustrative unicycle 900 in accordance with the present invention showing various elements of the drive system and suspension. Handlebars 902 are part of the steering system. Seat 904 is positioned above the unicycle wheel. With respect to the drive system, the drive sprockets of electric motors 906a and 906b are coupled to jackshaft sprocket 908 by belts 907a and 907b respectively. Electric motors 906a and 906b are attached to mounting bracket 910.

FIG. 9 further shows features of the steering system of the unicycle in accordance with the present invention. Certain aspects of this steering system, and some of the terminology, are similar to those used in connection with motorcycles. For example, the illustrative steering system has a "rake angle" 922 and "setback" distance 924. The rake angle is defined as the angle of the center of the fork pivot shaft 918 to a vertical line normal to the ground and to the centerline of the wheel axle. The setback is the distance between the centerline of fork pivot shaft 918 and the centerline of the axis of rotation of the wheel (parallel to the ground). The purpose of the set-back is to create geometry where the wheel will return to a centered position after the wheel is turned off axis. This geometry is well known and used here for similar benefits. Unlike a conventional bike and since there is no back wheel when the rider of this bike steers the front wheel back and forth to keep the bike balanced, this design actually moves the weight of the rider left and right over the wheel to keep the bike in balance.

Figure 10:
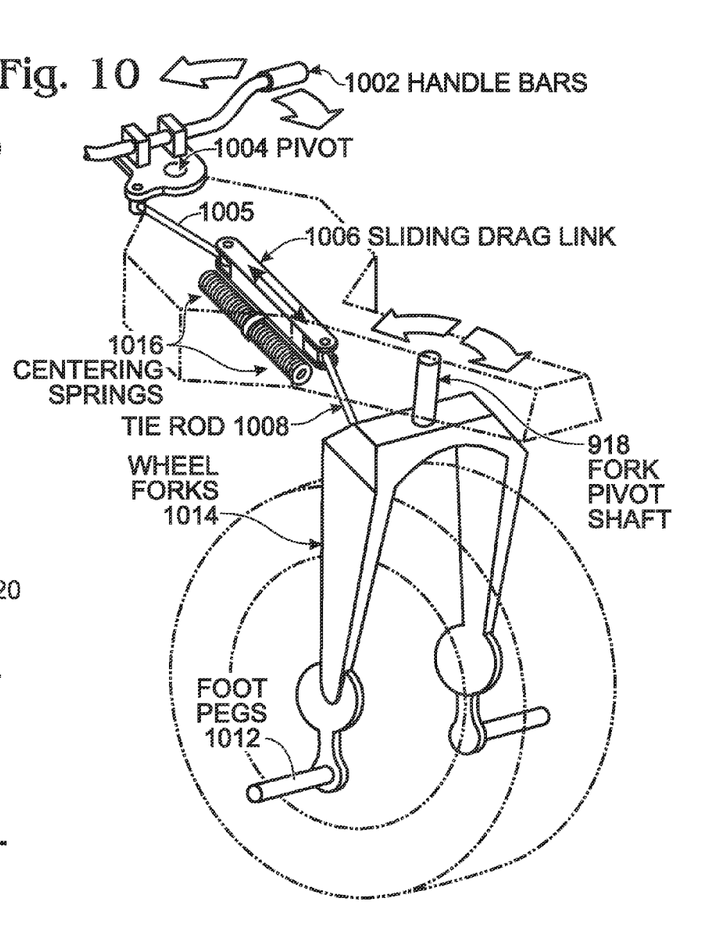
FIG. 10 shows an illustrative steering system of the unicycle in accordance with the present invention.

Referring to FIG. 10, in this illustrative embodiment, a remotely mounted handlebar assembly connected through a sliding drag link 1006 controls the steering of wheel forks 1014. As the handlebars 1002 are rotated they push or pull on a tie rod 1005 that causes sliding drag link 1006 to slide though a set of guide bushings. The drag link slides through a set of guide bushings that are fixedly mounted to the unicycle. In this illustrative embodiment, the drag link is a square as opposed to round shaft. This keeps the clevis and tie rods aligned to the steering and has minimal lost motion or "slop". This sliding motion transmits travel though a second tie rod 1008 to cause wheel forks 1014 to rotate. On one side of sliding drag link 1006 is mounted a tang that sits between two centering springs 1016. The purpose of these springs is to return sliding drag link 1006 and handlebars 1002 to a pre-determined center position. This also helps in riding the unicycle by offering some resistance to the rider's hands as they push against handlebars 1002. The tang is fix mounted to the drag link. The two springs are contained between a set of mounting pads that are fix mounted to the unicycle. When a rider turns the handlebars and then releases them, the centering springs bring the drag-link back to a common centered position. This could also could be a torsion spring mounted to the axis of rotation of the forks.

Still referring to FIG. 10, it is noted that a fork pivot shaft extends upwardly from the top portion of wheel forks 1014, and a foot peg 1012 extends perpendicularly outwardly from each of wheel forks 1014.

Figure 11:
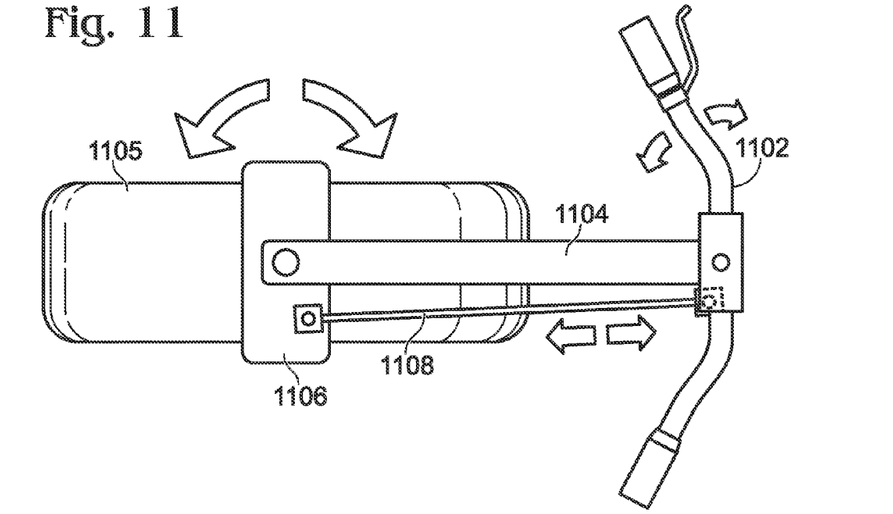
FIG. 11 is a top view of a self-balancing unicycle in accordance with the present invention showing parts of the steering system.

FIG. 11 is a top view of a self-balancing unicycle in accordance with the present invention showing parts of the steering system. More particularly, handlebars 1102 are coupled to body 1104, body 1104 is coupled to wheel forks 1106, and wheel forks 1106 are coupled to wheel 1105. In accordance with the present invention, a steering linkage 1108 is coupled between handlebars 1102 and wheel forks 1106. In the configuration shown in FIG. 11, turning handlebars 1102 to the right or left respectively pushes or pulls on wheel forks 1106 thereby exerting forces to change the direction of travel. It is noted that when a rider turns handlebars 1102 the center of mass of the rider/unicycle combination changes, and this also affects the direction of travel.

Figure 12:
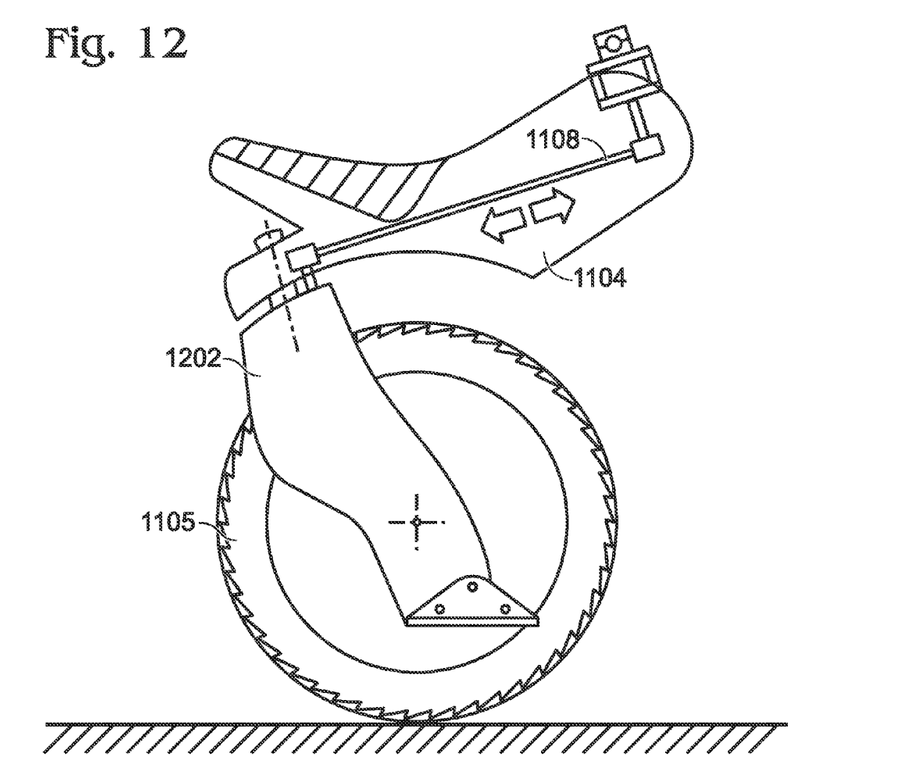
FIG. 12 is a side view of a self-balancing unicycle in accordance with the present invention showing parts of the steering system.

FIG. 12 is a side view of the self-balancing unicycle of FIG. 11, and shows parts of the steering system. Steering linkage 1108 is shown coupling the handlebars to the wheel forks. In this figure, side stirrup leg 1202 is also shown and from this viewpoint the wheel forks are hidden behind side stirrup leg 1202.

Even though various embodiments include a set of handlebars, a wheel and wheel forks, it is noted that the manner in which a rider steers the unicycle is different from steering a unicycle without handlebars, and different from steering a two-wheeled vehicle. Turning the handlebars to the right does not necessarily cause the unicycle to immediately turn right; it requires the rider to use their entire body and balance to impart the right moment to cause the unicycle to turn right.

Figure 13:
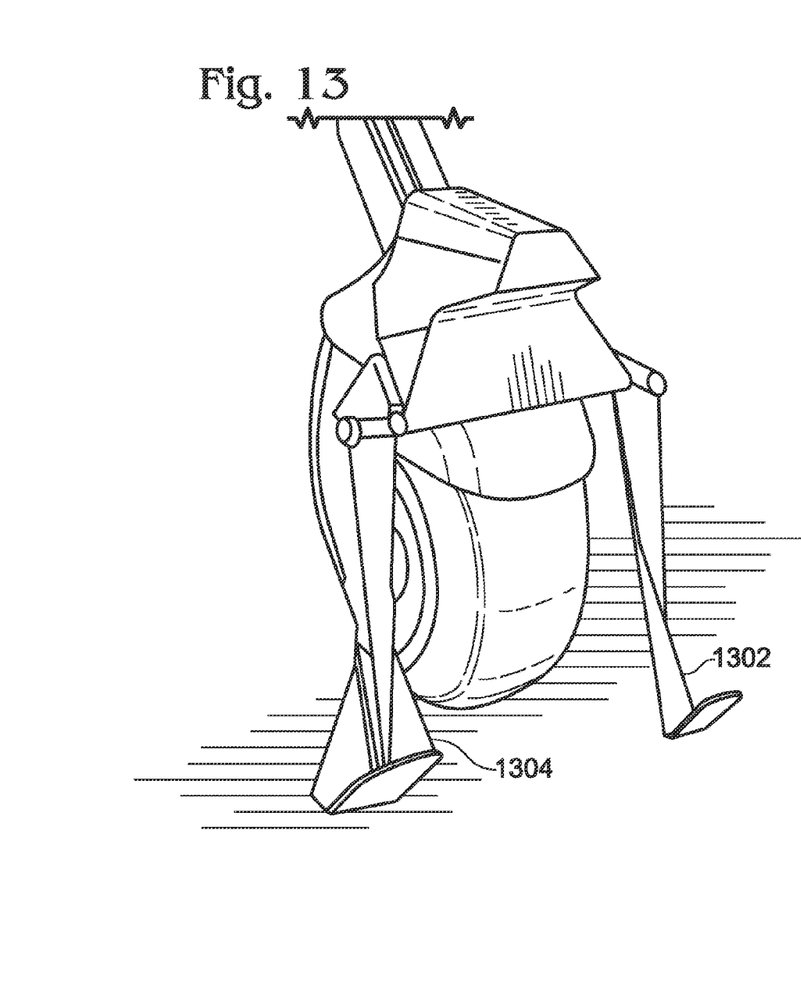
FIG. 13 shows a rear view of the unicycle with a kickstand apparatus that provides a three-point stand for stable parking.
Figure 14:
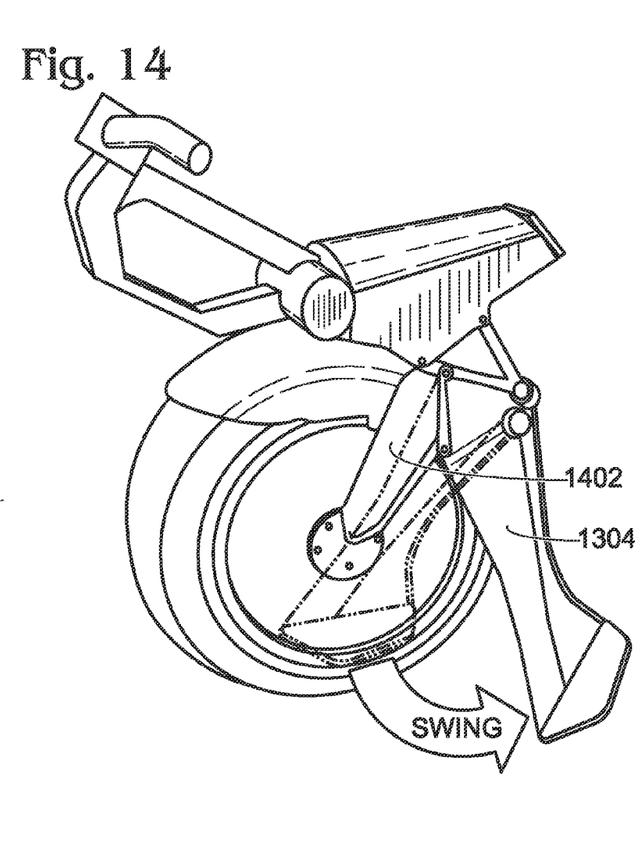
FIG. 14 shows a side view of the unicycle with a kickstand apparatus that provides a three-point stand for stable parking.

FIGS. 13-14 illustrate a version of a kickstand where the two side stirrup legs 1302, 1304 pivot out to the rear to form a solid three-point stand. Starting at a riding position as shown in FIG. 1, the side stirrups are configured to pivot to the rear. In this illustrative embodiment, the batteries are mounted inside the side stirrup legs to provide a weight shift such that when the legs are pivoted back, the unicycle does not tip forward. Referring to FIG. 14, it can be seen that wheel fork 1402 remains in its position when side stirrup leg 1304 is moved backwards into its kickstand position.

Figures 15, 16:
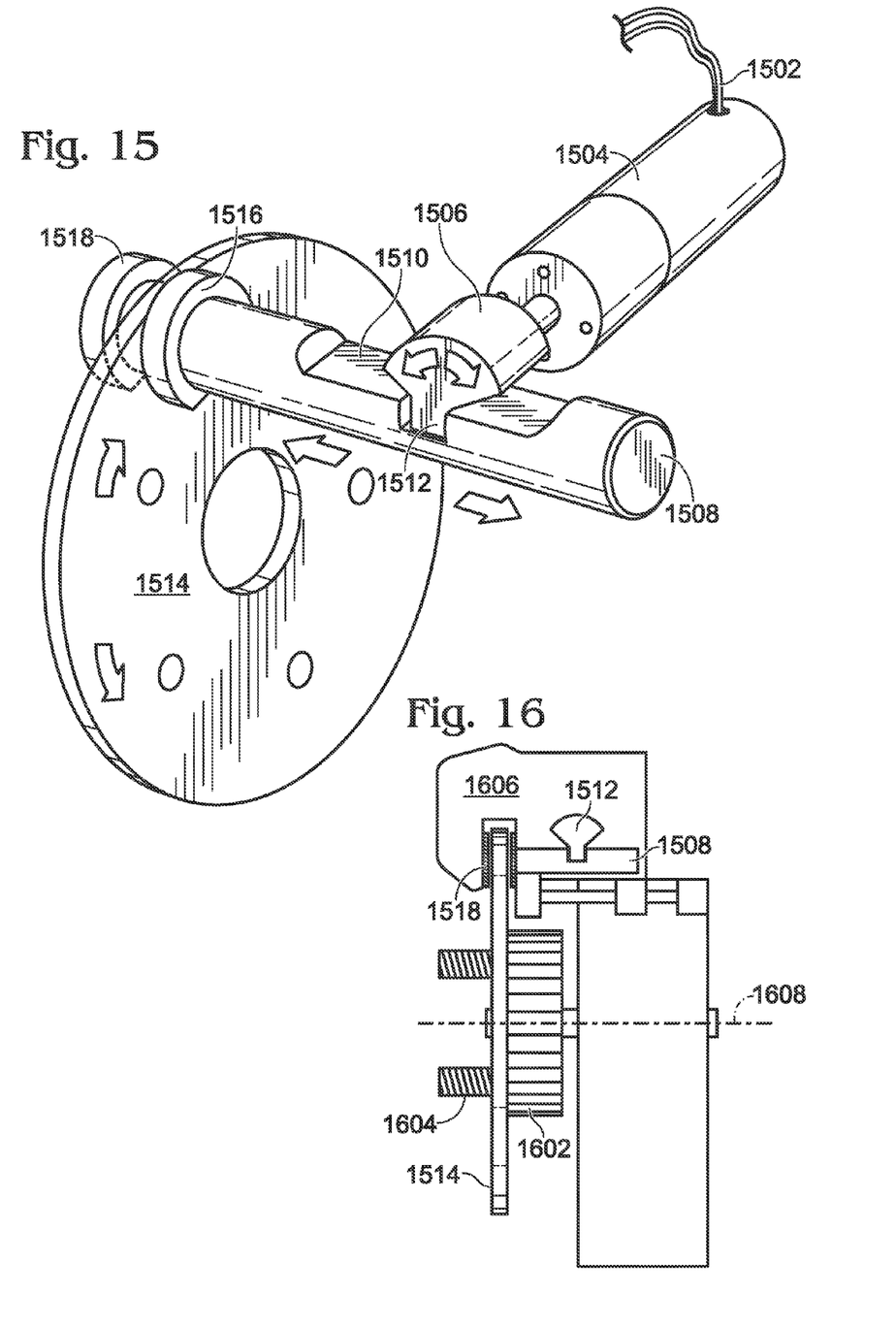
FIG. 15 is an illustration of the braking system of a self-balancing unicycle in accordance with the present invention.
FIG. 16 is an illustration of the braking system of a self-balancing unicycle in accordance with the present invention.

FIG. 15 is an illustration of the braking system of a self-balancing unicycle in accordance with the present invention. Power and control wires 1502 are connected to a sophisticated micro-controller that is looking at the tilt angle, rider input at the brake lever and the motor controller to decide how hard to apply the brake pressure to stop the unicycle while keeping it from pitching forward. A servo motor 1504 is connected to a pawl 1506 that translates the rotary motion of the motor into linear motion through a slot 1512 in shaft 1508. Pawl 1506 also includes a set of stop pads that engage with surface 1510 to stop over-rotation of shaft 1508 if motor control is lost. Linear motion of shaft 1508 presses on an inner brake pad 1516 that develops a clamping force through a housing 1606 and subsequent outer brake pad 1518. The clamping force imparts a squeeze on the rotating disc brake disc 1514 which slows the rotation of the wheel hub and the wheel. This squeeze pressure is modulated by the amount of DC power applied to servo motor 1504 by the brake controller. The benefit of this type of electro-mechanical brake is that it can be very quickly controlled by a micro-processor based control system, and it has the ability to dump a large amount of energy through heat as opposed to a dynamic brake system that uses the drive motors as generators to dump electrical energy back into the batteries.

FIG. 16 is an illustration of the braking system of a self-balancing unicycle in accordance with the present invention. FIG. 16 is similar to FIG. 15 but shows the braking system from a different viewpoint and further shows a few additional components. The axis of rotation for the wheel is indicated by center line 1608. The main drive sprocket 1602 is shown with rotor 1514 mounted on the threaded studs 1604. Additionally the caliper assembly 1606 is shown with the linkage of FIG. 15 shown in dashed lines.

Various embodiments of the present invention provide a unicycle that is electrically powered, has a set of handlebars connected to a common body structure that imparts a rotational force on a set of wheel forks, and wherein the wheel forks hold a wheel assembly. The wheel assembly has a motor assembly internal thereto and further has a set of human interface points that allow new riding positions and ways of creating fun, style and gymnastic riding experiences. The wheel assembly has a set of foot pegs mounted to each side that allow riders to place their feet there.

Various embodiments of the present invention provide a balance control system that uses a twist throttle and brake to tell the micro-controller to adjust the tilt angle relative to the acceleration or deceleration rate to reduce the need for the rider to lean forward or back.

Some embodiments provide a unicycle with a seat, handlebars and a full travel suspension system, which includes a set of swing arms, a swing arm bracket and a shock absorber. A unicycle in accordance with the present invention may have a set of side stirrups mounted rotationally to the fixed body structure, which act as swing-out kick stands.

Some embodiments of the unicycle have a steering system including a handlebar assembly, tie-rod, drag-link, tie-rod and wheel fork assembly. Other embodiments may have a steering system where the handlebars are connected directly to the wheel forks by one tie-rod. Still other embodiments have a steering system that includes a mechanism to return the steering mechanism to a centered position.

Various embodiments of the electric self-balancing unicycle include a flywheel stabilization system internal to the wheel that keeps the unicycle from tipping side to side while allowing the wheel to rotate on an axis similar to the rake angle of a typical two-wheeled steering system. In some of these embodiments a flywheel system includes a heavy weight flywheel spinning on a structure mounted to the frame of the unicycle.

It is noted that the unicycle may have replaceable body panels to allow customers to change body panels.

In one embodiment, an electric-powered, self-balancing unicycle, includes a wheel assembly, the wheel assembly including: a first electric motor having a first drive sprocket, and a second electric motor having a second drive sprocket, the first and second electric motors each attached to a mounting bracket; a jackshaft having a jackshaft sprocket disposed at a first end thereof; a first belt fitted to couple the first drive sprocket to the jackshaft sprocket; a second belt fitted to couple the second drive sprocket to the jackshaft sprocket; a main drive sprocket coupled to the jackshaft by a belt; and a rim coupled to the main drive sprocket; a wheel fork coupled to the wheel assembly; a body coupled to the wheel fork; handlebars rotatably coupled to the body; and a steering linkage coupled between the handlebars and the wheel fork.

In another embodiment, a self-balancing unicycle, includes a wheel assembly; a wheel fork coupled to the wheel assembly; a body coupled to the wheel fork; handlebars rotatably coupled to the body; a steering linkage coupled between the handlebars and the wheel fork; a brake lever physically coupled to the handlebars; a twist throttle physically coupled to the handlebars; and a controller electrically coupled to the brake lever, the twist throttle and the wheel assembly.

CONCLUSION

Various components of the unicycle in accordance with the present invention can be made from solid materials by CNC controlled machines or they can be mass produced through the use of molds and dies.

It is to be understood that the present invention is not limited to the illustrative embodiments described above, but encompasses any and all embodiments within the scope of the subjoined claims and their equivalents.

What is claimed is:

1. An electric-powered, self-balancing unicycle, comprising:
   a wheel assembly, the wheel assembly including:
      a first electric motor having a first drive sprocket, and a second electric motor having a second drive sprocket, the first and second electric motors each attached to a mounting bracket;
      a jackshaft having a jackshaft sprocket disposed at a first end thereof;
      a first belt fitted to couple the first drive sprocket to the jackshaft sprocket;
      a second belt fitted to couple the second drive sprocket to the jackshaft sprocket;
      a main drive sprocket coupled to the jackshaft by a belt; and
      a rim coupled to the main drive sprocket, wherein the mounting bracket, the first and second motors, the first and second drive sprockets, the jackshaft, the jackshaft sprocket, the first and second belts, and the main drive sprocket are all housed within an inside area formed by the rim for creating a bottom heavy weight distribution to aid in stabilized self-balancing;
   a wheel fork coupled to the wheel assembly;
   a body coupled to the wheel fork;
   handlebars rotatably coupled to the body; and
   a steering linkage coupled between the handlebars and the wheel fork.

2. The electric-powered, self-balancing unicycle of claim 1, further comprising a foot peg proximate the rim.

3. The electric-powered, self-balancing unicycle of claim 1, further comprising a first side stirrup leg disposed on one side of the unicycle and a second side stirrup leg disposed on an opposite side of the unicycle, each of the stirrup legs being weighted with one or more batteries.

4. The electric-powered, self-balancing unicycle of claim 1 consisting of one wheel being in contact with the ground during movement of the unicycle.

5. The electric-powered, self-balancing unicycle of claim 1, further comprising:
   a controller coupled to receive electric input signals indicative of the position of a twist throttle and a brake handle, and responsive thereto generate output signals that control the balance system such that a tilt angle is adjusted relative to the acceleration of the unicycle.

6. The electric-powered, self-balancing unicycle of claim 1, further comprising one or more batteries disposed within the inside area of the rim.

7. The electric-powered, self-balancing unicycle of claim 5, wherein the controller is disposed within the inside area of the rim.

8. An electric-powered, self-balancing unicycle, comprising a wheel assembly that includes:
   an electric motor having a drive sprocket;
   a jackshaft having a jackshaft sprocket;
   a first belt fitted to couple the drive sprocket to the jackshaft sprocket;
   a main drive sprocket coupled to the jackshaft by a second belt; and
   a wheel rim coupled to a wheel and to the main drive sprocket, wherein the electric motor, the drive sprocket, the jackshaft, the jackshaft sprocket, the first and second belts, and the main drive sprocket are all enclosed within the wheel rim for creating a bottom heavy weight distribution to aid in self-balancing;
   a supporting arm coupled to the wheel assembly;
   a body coupled to the supporting arm; and
   handlebars coupled to the body 9. The self-balancing unicycle of claim 8, wherein the wheel assembly further comprises a braking system, the braking system including a servo motor, a pawl coupled to the servo motor, a shaft coupled to the pawl, and a stop pad coupled to the shaft, the braking system being enclosed within the wheel rim.

10. The self-balancing unicycle of claim 9, wherein a squeeze pressure applied by the braking system is modulated by an amount of DC power applied to the servo motor.

11. The self-balancing unicycle of claim 8, wherein the wheel assembly further comprises a flywheel stabilization system enclosed within the wheel rim.

12. The self-balancing unicycle of claim 8, further comprising a gyro stabilization device enclosed within the wheel rim.

13. The self-balancing unicycle of claim 8, further comprising:
   a steering linkage coupled between the handlebars and a wheel fork;
   a brake lever in communication with a software-controlled braking system;
   a throttle for regulating speed; and
   a controller electrically coupled to the brake lever, the throttle and the wheel assembly.

* * * * *